2,892,701

PYROCHEMICAL DECONTAMINATION METHOD FOR REACTOR FUEL

Archie G. Buyers, Woodland Hills, Calif., assignor, by mesne assignments, to the United States of America as represented by the United States Atomic Energy Commission No Drawing. Application August 3, 1956
Serial No. 602,076

5 Claims. (Cl. 75—84.1)

My invention relates to an improved method of reprocessing irradiated nuclear reactor fuel, and more particularly to a pyrochemical reprocessing method for decontaminating neutron irradiated uranium and separating plutonium therefrom.

For information concerning the theory, construction and operation of nuclear reactors, reference is made to Glasstone, "Principles of Nuclear Reactor Engineering" (D. Van Nostrand Co.); "The Reactor Handbook" (3 volumes), available for sale from the Technical Information Service, Oak Ridge, Tennessee; U.S. Patents 2,708,-656 and 2,714,577 to Fermi et al.; and to "The Proceedings of the International Conference on Peaceful Uses of Atomic Energy," August 8–20, 1955, Geneva, Switzerland, available for sale at the United Nations Book Store, New York, N.Y. For specific information concerning the processing of nuclear reactor fuel, reference is made to Glasstone, supra, chapter 7 (pages 371–442). Unless otherwise indicated, conventional nuclear terminology will be employed. For example, "uranium" is meant to designate both the metal and the dioxide ($UO_2$).

In the operation of a nuclear reactor, a great variety of fission products are formed. Many of these elements have high neutron absorption cross-sections, and compete with the fissionable material for available neutrons. They thus act as reactor "poisons," and if unremoved may threaten the continuation of the chain fission reaction. Plutonium is formed in uranium-fueled reactors, and if unremoved after its equilibrium concentration has been reached, it may undergo fission at an uneconomical rate relative to its production, thereby sacrificing a valuable product. For these reasons reactor fuels are removed from a reactor for reprocessing long before the fissionable material has been consumed. The uranium in a spent fuel element represents an extremely valuable quantity, which when decontaminated may be refabricated into fuel elements.

It is estimated that the present reprocessing costs amount to as much as 25% of the total operating costs of a reactor. It can be appreciated that any reduction in this cost will greatly reduce the unit cost of generating nuclear power and improve its competitive position relative to power production from fossil fuels. As indicated in the above references, the standard present method for decontaminating reactor fuels is by solvent extraction methods. Typically in such methods, an aqueous, uranyl nitrate solution is countercurrently contacted with an organic extractant, such as tri-butyl phosphate, in an inert hydrocarbon diluent. The uranium and plutonium are extracted into the organic phase, while the majority of the fission products are confined to the aqueous phase. The uranium and plutonium are subsequently partitioned with an acidified aqueous strip solution. There are severe economic drawbacks to the solvent extraction recovery methods. Firstly, the irradiated fuel must be stored for at least sixty to ninety days to permit decay of short-lived fission products. This is done to reduce the radiation dosage received by the organic extractant, since organic materials decompose to some extent under nuclear irradiation. The unproductive storage of reactor fuels for several months prior to reprocessing greatly increases inventory charges. Then, before the metallic fuel can be introduced into the solvent extraction system, it must be dissolved with nitric acid to yield uranyl nitrate; likewise, upon completion of decontamination, the uranium must be reconverted to the metallic form for fuel element preparation. Each of these steps adds considerably to the reprocessing costs. The solutions treated are also relatively dilute and enormous volumes of radioactive solutions must be handled. This contributes to the major capital investment in a solvent extraction plant. Until such high costs can be reduced, nuclear reactor power will remain at an economic disadvantage.

An object of my present invention, therefore, is to provide an improved method for decontamination of irradiated reactor fuel.

Another object is to provide a rapid, low cost method for the substantial decontamination of neutron-irradiated uranium and the separation of plutonium therefrom.

Another object is to provide a decontamination method for irradiated reactor fuel wherein the physical form of the fuel is not altered during processing.

Still another object is to provide such a decontamination method wherein relatively small amounts of reagents are employed.

Yet another object is to provide a pyrochemical reprocessing method for irradiated reactor fuel wherein substantial decontamination is achieved.

Other objects and advantages of my invention will become apparent to those skilled in the art from the following detailed description and the appended claims.

In accordance with my present invention, I have provided a method for the decontamination of neutron-irradiated uranium and the separation of plutonium therefrom, which comprises contacting said uranium in a molten state with at least one molten uranium fluoride selected from the group consisting of uranium trifluoride and uranium tetrafluoride under an inert atmosphere and then separating the resulting fission products-containing salt phase from the resulting substantially decontaminated uranium phase.

The great advantage of my invention over liquid solvent extraction methods is that fuel elements can be processed at a reactor site immediately upon withdrawal from the reactor without a "cooling" period. Plutonium is virtually completely separated from the uranium and can be purified by solvent extraction means. Also, the uranium and plutonium in the salt phase can be reduced to form a highly decontaminated uranium-plutonium alloy. Upon decontamination the uranium may be directly reinserted into the reactor; thus, uranium inventory charges are greatly reduced. Maintenance of the uranium in metallic form eliminates the expense of dissolving and diluting the uranium and then later reducing it to the metallic form again. The need for great volumes of process reagents is eliminated. For example, about only one to two grams of salt is sufficient to extract substantially all fission products and plutonium from fifteen grams of uranium. The salt and uranium phases are substantially immiscible, and after cooling may be easily separated. While decontamination is not as complete as with the solvent extraction methods, the decontamination is sufficient to permit direct reuse of the fuel in a reactor, meeting all nuclear and metallurgical requirements. The pyrochemical processing and reuse cycle may be repeated four or five times before the build-up of fission products is sufficient to require complete decontamination by solvent extraction.

My method consists principally of contacting the uranium fluoride with irradiated uranium at an elevated temperature under an inert atmosphere until equilibrium between the resulting molten phases is obtained. The phases are separated and the uranium washed of any adhering salt. The procedure may be repeated with fresh salt for further purification, more than three such treatments not being necessary. Even a single equilibration results in the extraction of about 95% of plutonium and 90-95% of cesium, cerium, rare earths and strontium into the salt phase. The limiting fission products, which have not proven to be extractable to any great degree, are ruthenium and tellurium.

My discovery achieves notably efficient results in the decontamination of uranium metal with uranium tetrafluoride. For clarity in presentation, therefore, the invention will be illustrated hereinafter with respect to these reagents. While the amount of $UF_4$ contacted with irradiated uranium metal may satisfactorily vary over a wide range with efficient decontamination, it is desired to use a minimum quantity of this relatively expensive material. Thus, I find that a $UF_4/U$ mole ratio of at least approximately 0.06 yields efficient decontamination, while a mole ratio of approximately 0.10 is preferred.

Uranium tetrafluoride powder may be directly contacted with the uranium metal, but prefusing the $UF_4$ is generally preferred to drive off any foreign matter or moisture. The uranium metal surface should be cleaned prior to contacting with $UF_4$. Dilute mineral acids may be used, such as dilute nitric acid; degreasing may also be accomplished with one of the common low molecular weight organic solvents, such as acetone. The salt and metal are contacted in a crucible of a refractory material, for example, graphite. The crucible should be degassed prior to use by heating at an elevated temperature under vacuum.

The uranium metal and the $UF_4$ are melted in the crucible under an inert atmosphere, such as supplied by the noble gases, helium being preferred. Any trace of impurities in the inert gas which might react with uranium may be removed by a pretreatment in which the gas is passed over uranium turnings heated to 600° C. The inert gas may be introduced into a reactor vessel containing the crucible previously evacuated to a fine vacuum until nearly atmospheric pressure is reached. The crucible contents are then rapidly heated to approximately 1300±50° C. and held at this temperature until equilibrium is reached, a matter of approximately one-half hour. After the system has cooled, the salt and metal phases may be separated by physical means. The metal is then washed with an aqueous mineral acid to remove final salt traces from the surface of the ingot. Mineral acids such as hydrochloric, nitric and sulphuric acid may be used, while a 6 N $HNO_3$-saturated $H_3BO_3$ mixture is preferred.

The separation of the uranium tetrafluoride in the uranium metal phases may also be accomplished by direct distillation. Uranium tetrafluoride has a considerably greater vapor pressure than uranium metal (the melting point of $UF_4$ is approximately 1000° C., as compared with 1133° C. for uranium metal). A clean separation may be accomplished by such volatilization, and certain fission products which might not be ordinarily decontaminated, such as tellurium, are readily volatilized.

I have also found it effective to add to the uranium fluoride at least one fluoride salt selected from the group consisting of alkali metal and alkaline earth metals, lithium, calcium and magnesium fluorides being preferred. Typical compositions are $UF_4$—$CaF_2$—LiF and $UF_4$—$MgF_2$—LiF. While such mixtures may be only physically mixed prior to contact with the uranium metal, it is preferred that they also be prefused to remove moisture and impurities. An advantage in the use of the mixture over $UF_4$ alone is that smaller quantities of the more expensive $UF_4$ need be used. The mole ratio of the alkali and alkaline earth fluorides to the uranium may satisfactorily vary, a range of approximately 0.2–1.0 being satisfactory, while about 0.4 is preferred. With such salt mixtures, a $UF_4$ mole fraction of at least approximately 0.05 is satisfactory, while a mole fraction of approximately 0.10 is preferred. The alkali and alkaline earth fluorides cannot be considered as a substitute for the uranium fluoride, however. Decontamination would not be as efficient, no plutonium separation would be achieved and possible contamination of the uranium with calcium or lithium might result. Furthermore, if $UF_4$ highly enriched in U–235 is used alone, this would be a very convenient method of reenriching the fuel without processing through a gaseous diffusion system.

When the uranium fuel is bonded or encased in jackets for insertion into the reactor, it is necessary to separate the uranium from the cladding prior to the decontamination procedure. Conventional methods may be employed for this separation including mechanical decanning. Aluminum is the commonest cladding; the two practiced methods for its removal are with sodium hydroxide-sodium nitrate solution and with nitric acid containing a small amount of mercurous catalyst.

The following tables summarize a number of experimental runs and are offered as specific examples of my invention. In each case the equilibration was conducted in a graphite crucible, outgassed as indicated above, and enclosed in a conventional quartz reactor tube. The fluoride salt or salts were introduced into the crucible, the system evacuated, and an atmosphere of helium, purified by passage over uranium turnings heated to 600° C., was bled into the system and the salt fused into a compact mass. After the crucible and contents were cooled to room temperature and the helium removed, neutron irradiated uranium metal ($nvt=10^{16}$) cleaned with aqueous nitric acid, dried, and weighed was inserted into the graphite crucible containing the fused salt. The system was evacuated to a vacuum of 0.01–0.07 microns and purified helium gas introduced to nearly atmospheric pressure. The crucible contents were rapidly melted to 1300±50° C. by induction heating and were held at this temperature for one-half hour. After the system had cooled, the crucible was removed from the quartz tube. Salt and metal were separated by means of a steel mortar and pestle, and the metal washed with 6 N $HNO_3$-saturated $H_3BO_3$ mixture to remove final salt traces from the surface of the metal. The wash was added to a solution of separated salt phase which had been dissolved in a similar acid mixture. The remaining uranium metal was dissolved in acid and radiochemical analyses performed on both solutions. The results of these runs are summarized below. Fission products unaccounted for in the uranium or salt phases were found in the quartz tube.

TABLE I

*Plutonium distribution percentages*

| Example | Salt Composition | | Percent Plutonium | |
|---|---|---|---|---|
| | Salts | Mole Fractions | In Salt | In Uranium |
| 1 | $UF_4$ | 1.00 | 100 | |
| 2 | $UF_4$ | 1.00 | 100 | |
| 3 | $UF_4$ | 0.17 | 96.9 | 0.2 |
| | $CaF_2$ | 0.22 | | |
| | LiF | 0.61 | | |
| 4 | $UF_4$ | 0.46 | 97.2 | 1.1 |
| | $CaF_2$ | 0.14 | | |
| | LiF | 0.40 | | |

TABLE II

*Fission product distribution*

| Example | Phase | Percent Activity Measured | | | |
|---|---|---|---|---|---|
| | | Ce | Rare Earths | Sr | Cs |
| 1 | salt | 94.2 | 91.4 | 76.8 | 81.3 |
| | uranium | 0.5 | 0.2 | 0.3 | 0.1 |
| 2 | salt | 93.1 | 90.7 | 79.5 | 87.4 |
| | uranium | 0.6 | 0.3 | 0.2 | 0.2 |
| 3 | salt | 85.5 | 87.1 | 46.2 | 46.0 |
| | uranium | 4.5 | 4.1 | 2.9 | 3.3 |
| 4 | salt | 89.7 | 87.6 | 55.0 | 60.5 |
| | uranium | 0.9 | 0.4 | 0.3 | 0.4 |

The above examples are merely illustrative and not restrictive of my invention, which is inherently very broad. Variations may be made by those skilled in the art that are still within the spirit of my invention. Therefore, my invention should be understood to be limited only as is indicated by the appended claims.

Having thus described my invention, I claim:

1. A method for the decontamination of neutron-irradiated uranium and the separation of plutonium therefrom, which comprises contacting said uranium in a molten state with at least one molten uranium fluoride selected from the group consisting of uranium trifluoride and uranium tetrafluoride under an inert atmosphere at a temperature of approximately 1300±50° C. and under conditions wherein the mole ratio of uranium fluoride to uranium is at least approximately 0.06 to extract plutonium and fission products therein, and then separating the resulting fission products and plutonium-containing salt phase from the resulting substantially decontaminated uranium phase.

2. The method of claim 1, wherein said uranium is uranium metal and said uranium fluoride is uranium tetrafluoride.

3. The method of claim 1, wherein the mole ratio of said uranium fluoride to said uranium is approximately 0.1.

4. A method for the decontamination of neutron-irradiated uranium metal and the separation of plutonium therefrom, which comprises contacting said uranium in a molten state with a prefused molten mixture comprising uranium tetrafluoride together with at least one metal fluoride selected from the group consisting of lithium fluoride, calcium fluoride and magnesium fluoride under an inert atmosphere at a temperature maintained at approximately 1300±50° C. under conditions wherein the mole ratio of said fluoride mixture to said uranium metal is in the range of approximately 0.2 to 1.0 and the mole fraction of uranium tetrafluoride therein is at least approximately 0.05 until equilibrium has been reached, and then separating the resulting fission products and plutonium-containing salt phase from the resulting substantially decontaminated uranium metal phase.

5. A method for the decontamination of neutron-irradiated uranium metal and the separation of plutonium therefrom, which comprises contacting said uranium in a molten state with a prefused molten mixture comprising uranium tetrafluoride together with at least one metal fluoride selected from the group consisting of lithium fluoride, calcium fluoride and magnesium fluoride under an inert atmosphere at a temperature maintained at approximately 1300±50° C. wherein the mole ratio of said fluoride mixture to said uranium metal is approximately 0.4 and the mole fraction of uranium tetrafluoride therein is approximately 0.1 to extract fission products and plutonium therein, and then separating the resulting fission products and plutonium-containing salt phase from the resulting substantially decontaminated uranium metal phase.

References Cited in the file of this patent

Buyers et al.: "The Distribution of Tracer Plutonium and Fission Products Between Molten Uranium Metal and Molten Uranium Tetrafluoride," U.S.A.E.C. Document NAA–SR–926, June 1, 1954, declassified December 12, 1955; 26 pages. Available OTS, Dept. of Commerce, Washington 25, D. C. @ 25¢.

Buyers: Pyrochemical Separation Methods: I. The Distribution of Plutonium and Long-Lived Fission Products Between Molten Irradiated Uranium Fuel and Fused Inorganic Fluorides, U.S.A.E.C. Document NAA–SR–157, March 15, 1955, declassified December 14, 1955, 32 pages. Available OTS @ 25¢.